Nov. 4, 1958 — M. E. AHRENDT — 2,858,735
SHUTTER MECHANISM
Filed April 16, 1954 — 2 Sheets-Sheet 1

INVENTOR.
MERRILL E. AHRENDT
BY HIS ATTORNEYS.
HARRIS, KIECH, FOSTER & HARRIS

Nov. 4, 1958 M. E. AHRENDT 2,858,735
SHUTTER MECHANISM
Filed April 16, 1954 2 Sheets-Sheet 2
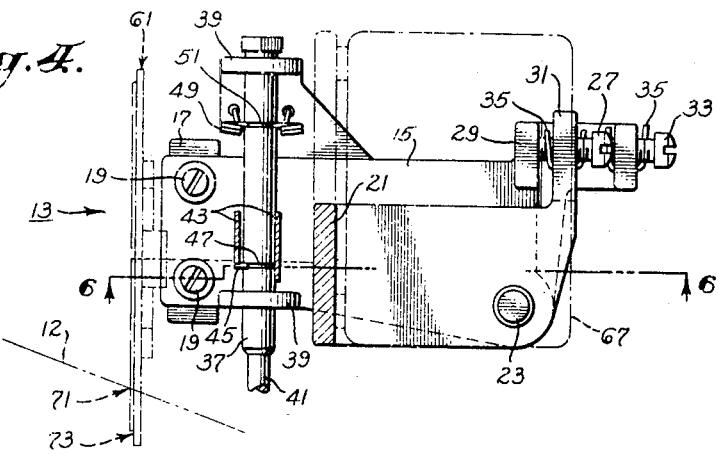
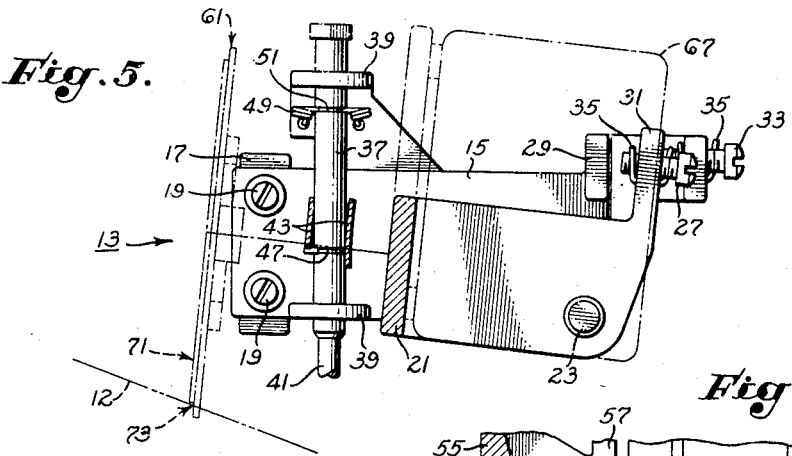
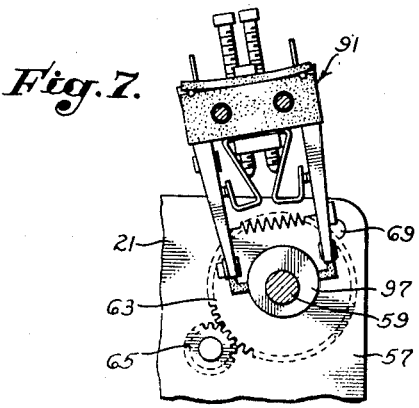
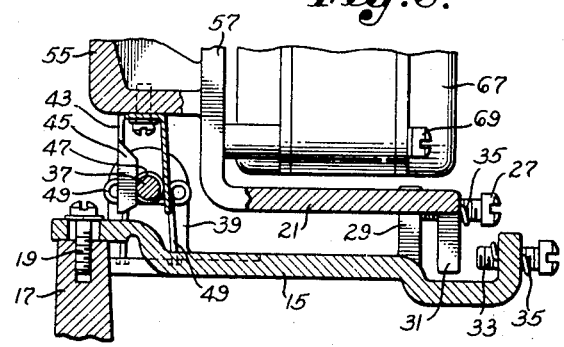
INVENTOR.
MERRILL E. AHRENDT
BY HIS ATTORNEYS.
HARRIS, KIECH, FOSTER & HARRIS United States Patent Office 2,858,735
Patented Nov. 4, 1958

2,858,735

SHUTTER MECHANISM

Merrill E. Ahrendt, Los Angeles, Calif., assignor to Beckman Instruments, Inc., Fullerton, Calif., a corporation of California Application April 16, 1954, Serial No. 423,606

8 Claims. (Cl. 88—61)

The present invention relates in general to an apparatus for selectively and periodically attenuating a beam of radiation, or, more particularly, to a radiation "chopper" as devices of this nature are commonly known in the art. Selective radiation attenuators or choppers find particular utility in spectrophotometry for reducing stray radiation effects in given wavelength regions and, as a matter of convenience, the present invention will be considered in such connection herein, although it will be understood that it is susceptible of other applications.

In Cary et al. Patent No. 2,607,899, granted August 19, 1952 and assigned to the same assignee as the present application, is disclosed a shutter mechanism 86 which selectively attenuates the beam of radiation traversing the spectrophotometer disclosed therein, this shutter mechanism including a shutter 88 which rotates alone to provide a first shutter means, and including a shutter 90 which rotates with the shutter 88 to provide a second shutter means, all for the purposes fully set forth in said patent. While the shutter mechanism 86 disclosed in said Cary et al. patent performs the functions desired of it entirely satisfactorily, a clutch means is required to engage and disengage the drive for the shutter 90 and a primary object of the present invention is to provide a selective wavelength attenuator or chopper capable of performing all of the functions of the shutter mechanism 86 of said Carey et al. patent with a single shutter, thereby eliminating the second shutter and any necessity for a clutch means for engaging and disengaging the drive to the second shutter.

More particularly, the primary object of the present invention is to provide an apparatus for performing the functions of the shutter mechanism 86 of said Cary et al. patent which includes a single rotatable shutter provided with radially spaced shutter zones having different beam attenuating characteristics, and which includes means mounting the shutter for lateral movement in a direction transverse of the axis of rotation of the shutter so as to align a selected one of the shutter zones with the beam of radiation. Thus, the present invention avoids the use of two shutters and clutch means for engaging and disengaging the drive to one of the shutters, this being an important feature of the invention.

Another object is to provide a device of the foregoing general nature wherein the mounting means for the shutter includes a support on which the shutter is rotatably mounted and includes a base on which the support is mounted for pivotal movement, whereby the shutter may be moved in a direction transverse of its axis of rotation so as to move a selected one of the shutter zones thereon into an operating position. In the embodiment herein illustrated in detail the pivot axis on which the support is mounted is perpendicular in direction to the direction of the axis of rotation of the shutter, the shutter being shifted laterally. A related object is to provide a mounting means wherein the axis of rotation of the shutter is perpendicular in direction relative to the direction of the pivot axis of the support, but is offset to one side thereof.

Another object is to provide an apparatus of the foregoing nature wherein a motor for driving the shutter is also mounted on the support and is operatively connected to the shutter, the motor thus shifting laterally with the shutter to simplify the shutter drive.

Another object is to provide a mechanical rectifier similar to the rectifier 108 of said Cary et al. patent and serving the same purpose, the rectifier of the present invention being mounted on the shutter support also and being actuated by means driven by the shutter motor.

Another object is to provide a shutter which includes a first shutter zone at one radius from the axis of rotation of the shutter and having circumferentially spaced sectors of different transparencies to radiation, the shutter also having a second shutter zone at a larger radius and provided with circumferentially spaced sectors of different transparencies to radiation.

Another object is to provide a first shutter zone which includes a selectively transmitting sector substantially transparent to a given stray radiation wavelength region but substantially attenuating radiation in a different, selected wavelength region, the first shutter zone also including a sector substantially transparent to both the given stray wavelength and said selected wavelength regions, the second-named sector being in practice an open space substantially transparent to all radiation in the impinging beam. Another object is to provide in a first shutter zone, in addition to sectors of the aforementioned transmission characteristics, one or more relatively narrow sectors or spokes substantially attenuating radiation in said stray radiation wavelength region.

Another object is to provide a first shutter zone in which a sector substantially attenuating radiation in a given, selected wavelength region is of approximately 180 degrees angular extent. Another object is to provide a relatively narrow sector in the form of a radially extending spoke substantially attenuating radiation in a given stray radiation wavelength region, this spoke being at a position in said first shutter zone substantially diametrically opposite the sector selectively transmitting the given stray radiation wavelengths.

Another object is to provide a first shutter zone which includes a selectively transmitting sector of approximately 180° in angular extent substantially transparent to a stray radiation wavelength region, the first shutter zone including two sectors of approximately 90° in angular extent transparent to all radiation in the impinging beam and sectors opaque to all said impinging radiation, the opaque sectors being radially extending spokes which separate the selectively transmitting sector from the sectors transparent to all the incident radiation and both the last-named sectors from each other.

Another object is to provide a second shutter zone which includes a sector substantially attenuating radiation in a selected wavelength region different from the selected wavelength region attenuated by a selectively transmitting sector of the first shutter zone, the two mentioned sectors being radially aligned with each other. It is a further object to provide two such aligned sectors each of which is 180° in angular extent.

Another object is to provide a second shutter zone in which the selectively transmitting sector attenuating radiation in a selected wavelength region is an opaque sector radially aligned with the sector in the first shutter zone which substantially attenuates a selected wavelength region, the second shutter zone including also an open sector substantially transparent to all radiation in the impinging beam. A further object is to provide in radial alignment a selectively transmitting sector in the first zone and an opaque sector in the second zone both of which are 180° in angular extent and to support the latter opaque sector by two spokes defining opaque sectors of the first shutter zone.

It will be understood that, without departing from the spirit of the invention as defined by the claims appended hereto, the specific shutter sector arrangements in the two zones may be modified, as, for example, by multiplying the number of sectors in each zone by a whole number greater than one. Also, more than two radially separated shutter zones may be used.

The foregoing objects, advantages and features of the present invention, together with various other objects, advantages and features thereof which will become apparent, may be attained with the exemplary embodiment of the invention illustrated in the accompanying drawings and described in detail hereinafter. Referring to the drawings.

Figure 3:
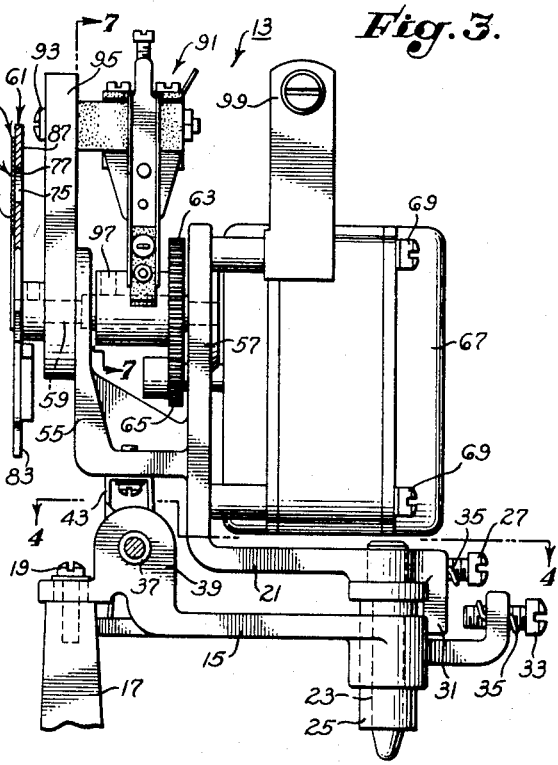
Fig. 3 is a side view of the apparatus of the invention, as viewed from the right side of Fig. 2.

Figs. 4 and 5 are sectional views both taken along the arrowed line 4—4 of Fig. 3 and respectively illustrating different operating positions of the apparatus of the invention; and Figs. 6 and 7 are fragmentary sectional views respectively taken along the arrowed lines 6—6 and 7—7 of Figs. 4 and 3, respectively.

Figure 1:
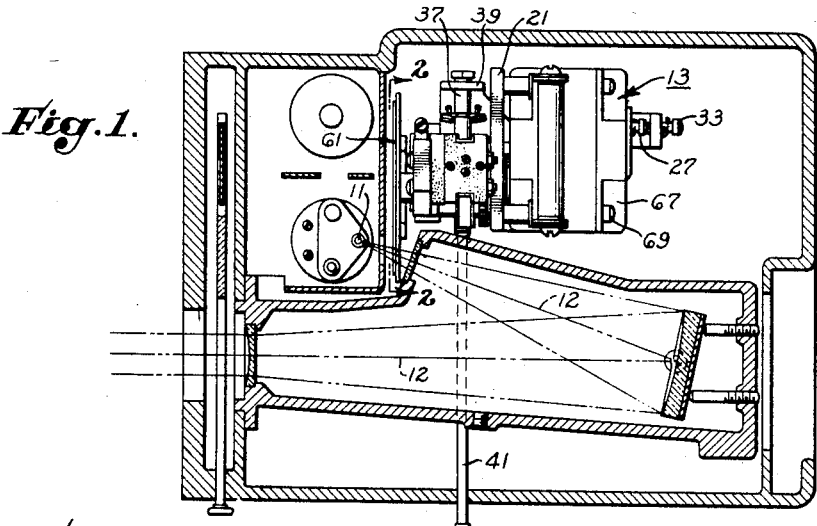
Fig. 1 is a horizontal sectional view illustrating a spectrophotometer radiation source compartment in which the present invention is installed, Fig. 1 being similar to Fig. 6 of the drawings of said Cary et al. patent.

Referring particularly to Fig. 1 of the drawings, illustrated therein is a spectrophotometer source compartment 10 having therein a radiation source 11, such as a Nernst glower, for example, and having therein an optical system for conveying radiation from the source 11 in the form of a radiation beam designated by the numeral 12. Also disposed within the compartment 10 is a selective radiation attentuating or chopping apparatus 13 which intercepts the radiation beam 12, it being understood that the environment in which the apparatus 13 of the invention is illustrated in Fig. 1 of the drawings is merely an example of one application of the invention, which is susceptible of various other applications.

Referring particularly to Figs. 2 to 6 of the drawings, the apparatus 13 includes a base 15 which is rigidly mounted on a suitable support 17, as by screws 19, the support 17 being, for example, an integral part of or rigidly connected to the compartment 10. Mounted on the base 15 for pivotal movement, about a pivot axis which is vertical for the particular orientation shown for the apparatus 13, is a shutter support 21, the latter carrying a pivot pin 23 disposed in a pivot bearing 25 on the base 15. The shutter support 21 is pivotable relative to the base 15 between two, or more, operating positions, respectively shown in Figs. 4 and 5 of the drawings, the operating position illustrated in Fig. 4 being determined by engagement of an adjusting screw 27 carried by the shutter support 21 with a stop 29 on the base 15. The operating position illustrated in Fig. 5 of the drawings is determined by engagement of a stop 31 on the shutter support 21 with an adjusting screw 33 on the base 15. As will be apparent, the operating positions of the shutter support 21 may be adjusted as required by means of the screws 27 and 33, these screws being provided with lock springs 35 to prevent variations in the adjustments thereof due to vibration, or the like.

The shutter support 21 is pivoted between its two operating positions by means of a reciprocable actuator 37 which is slidable in bearings 39 on the base 15, the actuator 37 having connected thereto a rod 41 which extends to the exterior of the compartment 10 to provide for manipulation of the actuator 37 to move the shutter support 21 into one or the other of its operating positions.

The shutter support 21 is operatively connected to the actuator 37 by means of a U-shaped spring clip 43, Fig. 6, having a flange 45 disposed in a groove 47 in the actuator 37, the two arms of the clip 43 embracing the actuator to retain the flange 45 in the groove 47, whereby reciprocatory motion of the actuator 37 is converted to pivotal movement of the shutter support 21 between the two operating positions discussed above. A U-shaped spring detent means 49 suitably anchored to the base 15 and engaged in a groove 51 in the actuator 37 tends to maintain the shutter support 21 in the operating position to which it has been moved by the actuator 37, the spring detent means 49 being an over-center mechanism.

The shutter support 21 is bifurcated to provide spaced arms 55 and 57 in which is journaled a shutter shaft 59 having a shutter 61 fixed on its outer end and having a gear 63 fixed thereon intermediate the arms 55 and 57. Meshed with the gear 63 is a drive gear 65 fixed on the shaft of a motor 67 for rotating the shutter 61, the motor being mounted on the shutter support 21, as by bolts 69 threaded into the arm 57. Thus, as the shutter support 21 is pivoted between the operating positions mentioned relative to the base 15, the shutter 61 and motor 67 pivot therewith to permit the use of the simple drive connection shown between the motor and the shutter, which is an important feature.

Figure 2:
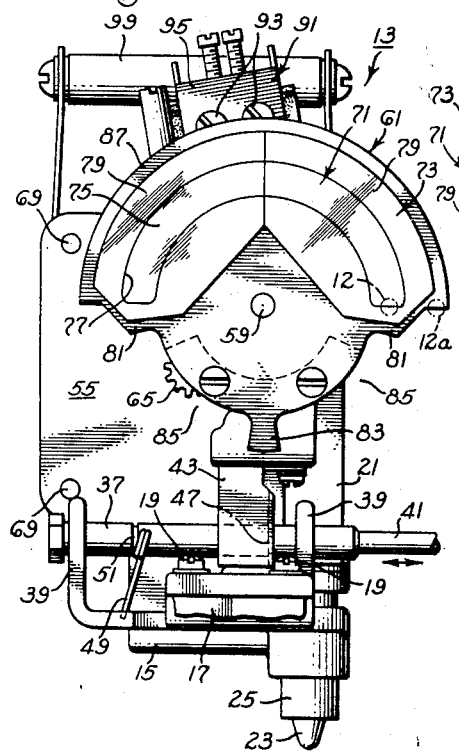
Fig. 2 is an end view of the selective radiation attenuating or chopping apparatus of the present invention, being taken as indicated by the arrowed line 2—2 of Fig. 1.

In the particular embodiment herein described in detail, as best shown in Figs. 2, 4 and 5, the axis of pivotal movement of the shutter support 21 relative to the base 15, and the axis of rotation of the shutter 61, are mutually perpendicular in direction, although the axis of rotation of the shutter is offset to one side of the pivot axis, as best shown in Fig. 2. Consequently, when the shutter support 21 is pivoted between its two operating positions, as hereinbefore discussed, two different radially spaced zones 71 and 73 of the shutter 61 are brought into alignment with or register with the radiation beam 12, the inner shutter zone 71 being shown in alignment with the radiation beam in Fig. 4 of the drawings and the outer shutter zone 73 being shown in alignment with the beam in Fig. 5 of the drawings. In Fig. 2 of the drawings, the inner shutter zone 71 is shown in alignment with the radiation beam 12, the position of the beam 12 relative to the shutter 61 when the shutter is in a position such that the beam 12 is intercepted by the outer shutter zone 73 being represented by the broken circle 12a.

The inner shutter zone 71 includes a sector 75 of substantially 180° in angular extent which is selectively transparent to a selected radiation wavelength region, but substantially attenuates a given stray radiation wavelength region, the sector 75 being formed by a window 77 in the shutter 61 which is covered by sheets 79 of a material having the desired spectral transmission characteristics. The selectively transmitting sector 75 is bounded at its ends by spokes 81 which in the embodiment shown have not only a mechanical support function, but an optical function also, namely, to strongly attenuate at least the impinging stray radiation wavelength to which sector 75 is substantially transparent. In practice spokes 81 are sectors of a material opaque to all radiation in the impinging beam, including selected and stray radiation wavelength regions. A third spoke 83 circumferentially aligned with the spokes 81 and the sector 75 is located diametrically opposite the sector 75. This spoke is a purely optical element, being opaque to or substantially attenuating at least the stray radiation wavelength region and in practice being opaque like spokes 81. The spokes 81 and 83 define therebetween open spaces 85 which, in effect, are sectors of the shutter zone 71 substantially transparent to all radiation in the impinging beam. Thus, as the shutter 61 rotates with the inner shutter zone 71 in register with the beam 12, the beam is by selective transmission partially attenuated by the sector 75, is subjected to substantially no attenuation by the sectors 85, and is partially or completely attenuated by the spokes 81 and 83 depending on the spoke material and upon the relative widths of the spokes and the beam, the spokes preferably being of such width relative to the beam width that only partial occlusion of the beam occurs, as more fully set forth in said Cary et al. patent.

Thus, it will be apparent that when the shutter 61 is in that operating position which aligns the inner shutter zone 71 with the beam 12, the shutter 61 performs all of the functions of the shutter 88 of said Cary et al. patent when it is rotating alone as a first shutter means. As will be discussed in the next paragraph, when the shutter 61 is in that operating position which aligns the outer shutter zone 73 with the beam 12, the shutter 61 performs all of the functions of the shutters 88 and 90 of the Cary et al. patent rotating together as a second shutter means. In other words, the two-position shutter 61 of the present invention performs all of the functions of the shutters 88 and 90 of said Cary et al. patent and eliminates any necessity for a clutch means to engage and disengage the drive to the shutter 90 of said Cary et al. patent, which are important features of the present invention.

Considering the outer shutter zone 73, it is shown in the present embodiment as including an opaque sector 87 of substantially 180° in angular extent in radial alignment with the selectively transmitting sector 75 of the inner shutter zone 71, the sector 87 being supported at its ends by the spokes 81. Open space exists between the spokes 81 on the opposite side of the shutter 61 from the opaque sector 87, thereby providing, in effect, a sector of substantially 180° in angular extent which is substantially transparent to all radiation in the impinging beam. Thus, it will be seen that the shutter 61, when in that operating position which aligns the outer shutter zone 73 with the beam 12, performs all of the functions of the shutter 90 of said Cary et al. patent when it is rotating concurrently with the shutter 88 thereof as the aforementioned second shutter means.

The apparatus 13 of the invention includes a full-wave mechanical rectifier 91 which, standing alone, is similar to the rectifier 108 of said Cary et al. patent and performs the same functions as said rectifier 108 so that a detailed description of the rectifier 91 herein is thought to be unnecessary. However, a feature of the present invention is that the rectifier 91 is also mounted on the shutter support 21, the rectifier 91 being attached, as by screws 93, to a mounting bracket 95 which is secured to the shutter support arm 55, or which may be formed integrally therewith if desired. Another feature of the present invention is that the rectifier 91 is actuated by a cam 97 also mounted on the shutter support 21, the cam 97 actually being an eccentric hub of the gear 63 on the shutter shaft 59. Thus, by mounting the rectifier 91 on the shutter support 21 and actuating it from the shutter shaft 59, a very simple actuating means for the rectifier is provided, which is an important feature of the invention.

The shutter support 21 is provided with a handle 99 which permits the entire assembly to be lifted out of the compartment 10 in a single motion, which facilitates inspection, adjustment, or repair.

Although an exemplary embodiment of the invention has been disclosed herein for purposes of illustration, it will be understood that various changes, modifications and substitutions may be incorporated in such embodiment without departing from the spirit of the invention as defined by the claims appended hereto.

I claim as my invention:

1. In an apparatus for selectively and periodically attenuating a beam of radiation, the combination of: a rotatable shutter provided with radially spaced shutter zones respectively having different beam attenuating characteristics, said shutter zones being within the perimeter of said shutter and each having at least one portion opaque to the beam of radiation; and means mounting said shutter for movement transversely of the axis of rotation of said shutter and transversely of the direction of the beam of radiation to align a selected one of said shutter zones with the beam of radiation.

2. In an apparatus for selectively and periodically attenuating a beam of radiation, the combination of: a rotatable shutter provided with radially spaced shutter zones respectively having different beam attenuating characteristics; and means mounting said shutter for movement transversely of the axis of rotation of said shutter and transversely of the direction of the beam of radiation to align a selected one of said shutter zones with the beam of radiation, said mounting means including a support on which said shutter is rotatably mounted and including a base on which said support is mounted for pivotal movement.

3. In an apparatus for selectively and periodically attenuating a beam of radiation, the combination of: a rotatable shutter provided with radially spaced shutter zones respectively having different beam attenuating characteristics; and means mounting said shutter for movement transversely of the axis of rotation of said shutter and transversely of the direction of the beam of radiation to align a selected one of said shutter zones with the beam of radiation, said mounting means including a support on which said shutter is rotatably mounted and including a base on which said support is mounted for pivotal movement about a pivot axis lying along a direction perpendicular to the direction of the axis of rotation of said shutter, the axis of rotation of said shutter being offset to one side of said pivot axis.

4. In an apparatus for selectively and periodically attenuating a beam of radiation, the combination of: a rotatable shutter provided with radially spaced shutter zones respectively having different beam attenuating characteristics, said shutter having in one of said shutter zones a sector substantially transparent to radiation in a stray radiation wavelength region and having in another of said shutter zones sectors respectively opaque and substantially transparent to all radiation in the beam of radiation; and means mounting said shutter for movement transversely of the axis of rotation of said shutter and transversely of the direction of the beam of radiation to align a selected one of said shutter zones with the beam of radiation.

5. In an apparatus for chopping a beam of radiation to reduce stray radiation effects in a spectrometer, the combination of: a rotatable shutter provided with radially spaced shutter zones respectively operable in different spectral regions, each of said shutter zones including a first sector substantially transparent to radiation in the corresponding spectral region and including a second sector capable of materially attenuating radiation in the corresponding spectral region, said second sector of at least one of said shutter zones being substantially transparent to stray radiation wavelengths outside the corresponding spectral region; and means mounting said shutter for movement transversely of the axis of rotation of said shutter and transversely of the direction of the beam of radiation to align a selected one of said shutter zones with the beam of radiation.

6. An apparatus as defined in claim 5 wherein said mounting means includes a support on which said shutter is rotatably mounted and includes a base on which said support is pivotally mounted, the pivot axis of said support extending in a direction perpendicular to the direction of the axis of rotation of said shutter.

7. An apparatus as defined in claim 6 including a motor for rotating said shutter mounted on said support and connected to said shutter.

8. In an apparatus for chopping a beam of radiation to reduce stray radiation effects in a spectrometer the combination of: a rotatable shutter provided with radially spaced shutter zones respectively operable in different spectral regions, one of said shutter zones including a sector of approximately 180° in angular extent substantially transparent to stray radiation wavelengths outside the corresponding spectral region, said shutter having spokes respectively extending radially outwardly at the ends of said sector in said one shutter zone, and having a third spoke of substantially the same length as the spokes first mentioned and extending radially outwardly in said one shutter zone at a point substantially diametrically opposite said sector, said shutter also including an opaque sector in another of said shutter zones and located radially outwardly of and radially aligned with the first sector mentioned and carried by the spokes first mentioned; and means mounting said shutter for movement transversely of the axis of rotaiton of said shutter and transversely of the direction of the beam of radiation to align a selected one of said shutter zones with the beam of radiation.

References Cited in the file of this patent

UNITED STATES PATENTS

| | | |
|---|---|---|
| 1,340,887 | Gordon | May 25, 1920 |
| 1,573,890 | Woodward et al., | Feb. 23, 1926 |
| 1,816,083 | Hnatek | July 28, 1931 |
| 2,012,145 | Stanley | Aug. 20, 1935 |
| 2,184,710 | Cobb | Dec. 26, 1939 |
| 2,442,910 | Thomson | June 8, 1948 |
| 2,494,440 | Haynes | Jan. 10, 1950 |
| 2,589,414 | Martin et al. | Mar. 18, 1952 |
| 2,607,899 | Cary et al. | Aug. 19, 1952 |
| 2,679,185 | Atwood | May 25, 1954 |